Figure 1:
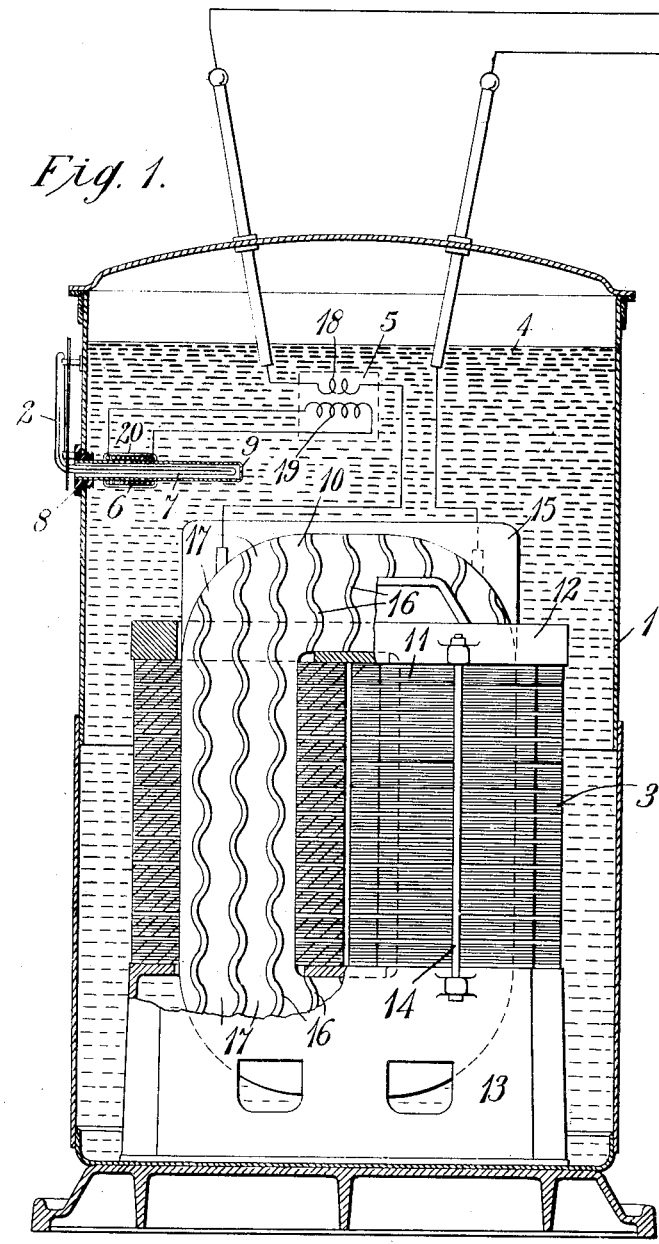

C. LE G. FORTESCUE.
TEMPERATURE INDICATOR.
APPLICATION FILED FEB. 21, 1911.

1,156,680.

Patented Oct. 12, 1915.

WITNESSES:
Fred H. Miller
D. H. Mace

INVENTOR
Charles Le G. Fortescue
BY
Wesley G. Carr
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

TEMPERATURE-INDICATOR.

1,156,680.  Specification of Letters Patent.  Patented Oct. 12, 1915.

Application filed February 21, 1911. Serial No. 609,941.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Temperature-Indicators, of which the following is a specification.

My invention relates to temperature indicators for electrical apparatus which is immersed in or otherwise influenced by a cooling medium, and it has special reference to transformers which are employed in connection with electric railway systems on which the overloads are frequently sudden and excessive.

The object of my invention is to provide a device of the above indicated class which shall be simple and inexpensive in construction, reliable and sensitive in operation and particularly adapted to register the temperature of the copper in the transformer coils.

In the past it has been customary to equip transformers of relatively large capacity with thermometers which projected into the tanks and were immersed in the insulating oil contained therein. Thus, the thermometer registered the temperature of the oil which, in case of normal and stable operation, was an approximate indication of the temperature and condition of the transformer coils. It is evident that such a device gave only approximate indications of the existing conditions, on account of the large body of oil to be heated and the high specific heat thereof and, hence, was considered useful only in installations where the load was steady or subject to only gradual and comparatively narrow fluctuations.

With the use of transformers in the feeder systems of electric railways and railroad electrifications on which the demand fluctuated within wide limits, and excessive overloads of comparatively short duration were frequent, the indications of such thermometers were unreliable and useless. For instance, although a serious and damaging overload might occur upon the transformer, the total heat generated in the copper during the period of overload would not be sufficient to raise the temperature of the oil to a point that would materially affect the thermometer, and hence, the indications would be of no value.

It is the purpose of my present invention to overcome this difficulty and provide means whereby the thermometer will register accurately and quickly the temperature of the copper in the transformer coils. I accomplish this result by reproducing the conditions which affect the temperature of the coil copper, and I secure these conditions by influencing the thermometer by the insulating oil and also in proportion to the current which traverses the transformer windings. In order to produce the required degree of sensitiveness and accuracy, very careful and precise experimental adjustments are necessary, as will be hereinafter set forth. It should be understood that my invention is not restricted to use with transformers but is capable of application to any electrical apparatus which is affected by any cooling medium.

Figure 2:
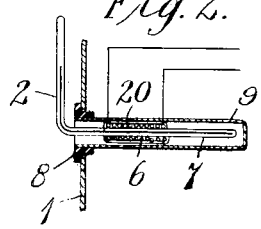

Figure 1 of the accompanying drawing is a view, partially in elevation and partially in vertical section, of a transformer which embodies my invention, a portion of the apparatus being shown diagrammatically for simplicity, and Fig. 2 is a view of a modified portion of the device shown in Fig. 1.

Referring to the drawing, the device here shown comprises a containing tank 1, a thermometer 2, a transformer 3, a body of insulating oil 4, an auxiliary series transformer 5 and a heating coil 6. The thermometer 2, which may be of any ordinary type of construction, is mounted on the containing tank 1 and is provided with a laterally extending portion 7 which projects through a bushing 8 in the side of the tank 1 and is enveloped by a sheath 9 of good heat-conducting material, the latter being immersed in the body of insulating liquid 4, in the usual manner.

The transformer 3 may be of any well known construction and comprises a plurality of transformer coils 10 which are assembled side by side upon a suitable laminated core structure 11 which is firmly held together by means of upper and lower end frames 12 and 13 and tie rods 14. Each of the transformer coils 10 is separated from adjacent insulating barriers 15 by means of wave shaped spacing strips 16 which are disposed longitudinally at the respective sides of said coils in order to provide passages 17 through which the insulating oil 4 may circulate.

The auxiliary series transformer 5 forms no part of my invention, except as it performs a necessary function in its operation, and it may be of any suitable construction. The primary winding 18 of the series transformer 5 is connected in series with the transformer coils 10, while its secondary winding 19 is connected to the heating coil 6 which surrounds a portion of the projecting member 7 of the thermometer 2. A lagging 20 of heat-insulating material envelops the heating coil 6, in order to confine the heat of said coil and effectively impart it to the thermometer.

When the transformer is put into operation, the insulating oil 4, which lies adjacent to the transformer coils 10 becomes heated and, consequently, rises to the top of the tank, whereby a circulation of oil is established through the passages 17, as will be readily understood. This circulation brings the heated oil into contact with the exposed sheath 9 and thus it coöperates with the heating coil 6 to influence the thermometer 2.

Those skilled in the art will understand that the actual temperature of the transformer coil copper depends upon the temperature of the oil in the immediate neighborhood thereof, the amount of heat dissipated through the insulation of the coil and the current which traverses the transformer coil. By means of the apparatus hereinbefore described, and careful experimental adjustments which will be hereinafter set forth, I proportionately reproduce the heating conditions which affect the copper of the transformer coils and apply the same to the thermometer 2, whereby the temperature of the copper is accurately indicated.

Having assembled the apparatus, as hereinbefore indicated, preliminary adjustments are made experimentally to determine the correct amount of heat to impart to the thermometer 2 through the agency of the heating coil 6, and subsequently to determine the proper physical and electrical properties of the coil in order that the thermometer will be sufficiently sensitive to changes in the temperature of the copper in the transformer coils. These adjustments are accomplished as follows: Normal current is first allowed to flow in the transformer a sufficient time to establish stable heat conditions of both the transformer coils 10 and the insulating oil 4, after which the ratio of the series transformer 5 is varied until the heat generated in the heating coil 6 is just sufficient to cause the thermometer 2 to register the correct temperature of the transformer copper, as calculated in the usual manner.

Although it will probably be preferable to accomplish this result by adjustments of the series transformer, which may conveniently be provided with a plurality of taps (not shown) for the purpose, it will be understood that any of the various other well known means for varying the heating effect of the coil 6 may be employed.

Having once arrived at the proper amount of heat for the coil 6 to impart to the thermometer 2, it is merely a matter of adapting the coil so that the action of the thermometer will be sensitive and quick enough to be of practical use. This is accomplished by subjecting the transformer 3 to a slight overload and comparing the thermometer indication to the actual temperature of the coil copper as calculated from the rise in resistance.

If it is found that the thermometer registers too low, it is evident that the heating coil 6 acts too slowly and must be adjusted to follow the actual temperature changes quickly. This may be done by keeping the heat generated in the coil 6 constant and equal to the amount previously experimentally determined, maintaining the heating surface exposed to the thermometer the same, and decreasing the amount of material in the coil to be heated, thereby necessitating an increase in the current density. Such an adjustment will tend to make the heat developed in the coil 6 more effective in influencing the thermometer quickly and will tend to bring the temperature curve of the thermometer 2 co-incident with that of the copper in the transformer coils, which is essential if the indications of the thermometer are to correspond accurately to the temperature of the coil copper, as will be readily understood.

It is not considered necessary to describe in detail the specific adjustments just referred to, as it is merely a matter of design and experiment, and it is believed that no difficulty will be experienced by those skilled in the art in understanding the same.

If, after the foregoing adjustments have been made, it is found that the thermometer still lags in its action, careful and successive changes should be effected in a manner similar to those hereinbefore set forth, until the thermometer finally becomes sensitive enough to accurately indicate the temperature of the copper in the transformer coils.

It may be found impossible to secure the desired degree of sensitiveness in this manner, which merely indicates that the rate of heat dissipation from the thermometer to the surrounding oil is insufficient. In this case, the coil 6 should be rewound to cover a reduced amount of the thermometer surface, after which a new preliminary determination of the correct amount of heat to generate in the coil is necessary. The hereinbefore mentioned adjustments of the coil for the purpose of making the thermometer quickly responsive to variations in the temperature of the coil copper should then be effected in the manner described, until the required degree of sensitiveness is obtained.

Under certain conditions, it may be desirable to change the design of the thermometer itself by varying the size of the bulb, etc., in order to accomplish the desired results.

It follows, of course, that converse adjustments of the heating coil 6 should be made if the action of the thermometer is found to be in advance of the actual transformer copper temperature.

In some cases, it may be preferable to dispose the heating coil 6 within the protecting sheath 9 and in intimate contact with the thermometer 2 as shown in Fig. 2. Thus, the heat of the coil 6 is more effectively imparted to the thermometer.

With single phase transformers having a plurality of independent secondary coils and with polyphase transformers which are likely to carry unbalanced loads, it will probably be expedient to provide each winding of the transformer with a temperature indicating device in the manner hereinbefore set forth.

Although I have shown and described a device of specific construction and arrangement and location of parts, it is evident that various modifications may be effected without departing from the spirit and scope of my invention, and I desire that only such limitations shall be imposed as are indicated in the appended claims.

I claim as my invention:

1. The combination with electrical apparatus enveloped in a cooling medium, and a temperature-indicating device associated therewith and adapted to be influenced by said cooling medium, of stationary means for influencing said device in accordance with the current traversing said electrical apparatus.

2. The combination with an electric conductor, a cooling medium enveloping the same, and a thermometer for indicating the temperature of said conductor and adapted to be influenced by said cooling medium, of electro-thermal means associated with said thermometer for influencing said thermometer in proportion to the current traversing said electrical conductor.

3. The combination with an electric conductor, a cooling medium enveloping the same, and a thermometer for indicating the temperature of said conductor and adapted to be influenced by said cooling medium, of electro-thermal means associated with said thermometer for influencing said thermometer in proportion to the current traversing said electrical conductor, the relative influences being proportioned in accordance with predetermined conditions.

4. The method of indicating the temperature of electrical apparatus which is enveloped in a cooling medium, that consists in heating a thermometer in proportion to the current traversing said apparatus and at the same time exposing it to the influence of said cooling medium.

5. The method of indicating the temperature of an electrical conductor which is enveloped in a cooling medium, that consists in exposing a temperature-indicating device to the influence of said cooling medium and also to the current traversing said electrical conductor, said influences being proportioned in accordance with operating conditions.

6. The method of indicating the temperature of an electric current conductor, which is thermally associated with a surrounding medium that consists in exposing a temperature indicator to the direct influence of said medium and in exposing said indicator to an additional influence which is dependent upon the current traversing the conductor, said influences being proportioned to effect similar thermal characteristics in said conductor and said temperature indicator.

7. The combination with an electric current conductor surrounded by a cooling medium, and a temperature indicator exposed to the influence of said medium, of a heating coil associated with said indicator and dependent upon the current traversing said conductor for its influence upon said temperature indicator.

8. The combination with an electric current conductor surrounded by a cooling medium, and a temperature indicator exposed to the influence of said medium, of a heating coil disposed around a portion of said indicator and dependent upon the current traversing said conductor for its influence upon said indicator.

9. The combination with a liquid-containing tank, a transformer immersed therein, and a thermometer, of electro-thermal means associated with said thermometer for causing said thermometer to indicate the temperature of the copper in the transformer coils.

10. The combination with a liquid-containing tank, an electric device immersed therein, and a thermometer projecting into said liquid, of electro-thermal means associated with said thermometer and with said electrical device for influencing the action of said thermometer.

11. The combination with a liquid-containing tank, a transformer immersed therein, and a thermometer associated therewith and projecting into said liquid, of electro-thermal means for influencing said thermometer in proportion to the current traversing the transformed coils.

12. The combination with a liquid-containing tank, a transformer immersed therein, and a thermometer projecting into said liquid, of electro-thermal means dependent upon the current flowing in said transformer for causing said thermometer to indicate the temperature of the copper in the transformer coils.

13. The combination with a transformer immersed in an insulating liquid, and a thermometer adapted to be influenced in accordance with the temperature of the insulating liquid, of means electrically associated with said transformer for influencing said thermometer in proportion to the current in said transformer.

14. The combination with a main transformer, an insulating medium, and a temperature-indicating device adapted to be influenced by said insulating means, of a series transformer having its primary winding connected in series with said main transformer, and a heating coil associated with said temperature-indicating device and connected to the secondary winding of said series transformer.

15. The combination with a liquid-containing tank, an electric device immersed therein, a temperature-responsive device projecting into the said liquid, of electrothermal means associated with the said temperature-responsive device and with the said electrical device for influencing the action of the said temperature-responsive device.

In testimony whereof, I have hereunto subscribed my name this 13th day of Feb. 1911.

CHARLES LE G. FORTESCUE.

Witnesses:
W. M. McConabey,
B. B. Hines.